Aug. 24, 1965 W. A. YONKERS 3,201,852

METHOD OF SOLDERING

Filed Sept. 5, 1961

WILLIAM A. YONKERS
INVENTOR.

BY Rudolph J. Jusich
ATTORNEY

United States Patent Office
3,201,852
Patented Aug. 24, 1965

3,201,852
METHOD OF SOLDERING

William A. Yonkers, Mountain Lakes, N.J., assignor to Radio Frequency Laboratories, Inc., Boonton, N.J., a corporation of New Jersey Filed Sept. 5, 1961, Ser. No. 136,020
4 Claims. (Cl. 29—155.5)

This invention relates to a soldering method useful in soldering together two or more wires with a maximum degree of facility and safety.

Electrical components, such as resistors, capacitors, etc., are provided with lead wires by means of which the components can be connected into an electrical circuit. In the case of miniaturized components, such lead wires are of very small gauge wire and generally of short length. Even if the lead wires are relatively long, it is often desirable to cut them to a short length in order to maintain desired circuit characteristics and provide a compact assembly of the circuit components.

Because of the small diameter and short length of the lead wires, there arises a problem of soldering connection wires thereto without applying excess heat to the wires, with possible damage to the component, and without damaging adjacent components by the soldering iron during the soldering operation.

An object of this invention is the provision of a method for soldering together two or more wires conveniently, quickly and positively without the application of excess heat thereto.

An object of this invention is the provision of a method for soldering a connection wire to a lead of a component, particularly a miniature component, with a minimum possibility of damaging the component.

An object of this invention is the provision of a method for soldering together the ends of two wires in side-by-side disposition while, at the same time, resulting in complete insulation of the soldered joint.

These and other objects and advantages will become apparent from the following description when taken with the accompanying drawings. It will be understood, however, that the drawings are for purposes of illustration and are not to be construed as defining the scope or limits of the invention, reference being had for the latter purposes to the claims appended hereto.

In the drawings wherein like reference characters denote like parts in the several views.

Figure 1:
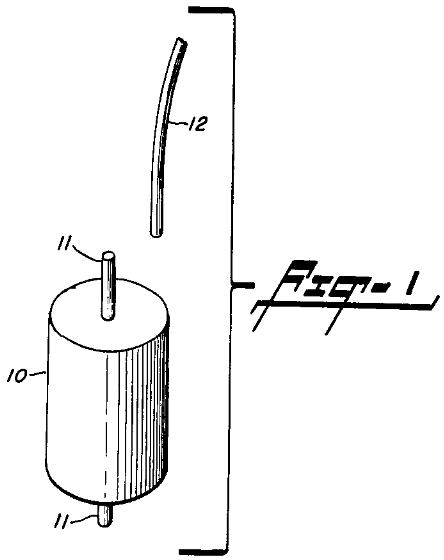
FIGURE 1 is an isometric view showing an end of a connection wire that is to be soldered to a lead of an electrical component.
Figure 2:
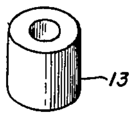
FIGURE 2 is an isometric view of a resilient, tubular member used to facilitate the soldering of the wire to the component lead.

Referring now, to the drawings, there is shown an electrical component, such as the capacitor 10, having lead wires 11, 11 extending therefrom. The lead wires are pre-tinned as is conventional in this art. There is also shown the pre-tinned end of a connection wire 12 which is to be soldered to a lead 11. It is here pointed out that the drawings are made to an enlarged scale, the lead wires of miniature components being of very small diameter, that is, substantially smaller than that of conventional wire used for wiring an electrical or electronic circuit.

A resilient bushing 13, made of an elastomeric silicone, or other material capable of elastic deformation and withstanding normal soldering temperatures, has an axial length substantially corresponding to the length of the component lead and a hole diameter somewhat exceeding the lead diameter.

Figure 3:
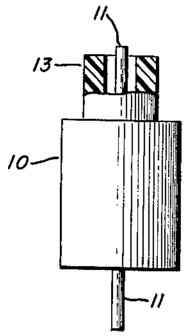
FIGURE 3 is an elevational view, with parts in cross section, showing the tubular member positioned over the component lead.
Figure 4:
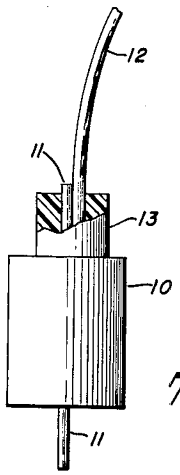
FIGURE 4 is similar to FIGURE 3 and showing the end of the connection wire also inserted into the tubular member.

The resilient bushing is first placed over the lead as shown in FIGURE 3. Whether or not the lead extends slightly beyond the bushing surface is immaterial for purposes of this invention, the only requirement being that a significant length of the lead 11 be available for soldering purposes. The pre-tinned end of the connection wire 12 is then inserted into the opposite end of the bushing, as shown in FIGURE 4. When only a single connection wire is to be soldered to the lead wire, the hole diameter of the bushing is such that when the two wires are in soldering position, as shown in FIGURE 4, the bushing is stretched slightly, that is, some force is required to insert the connection wire into and substantially through the bushing. Consequently, the bushing serves to compressively retain the two wires 11 and 12 in longitudinal contact throughout substantially the length of the bushing. With the two wires so retained in physical contact, a soldering iron tip applied momentarily to the wire 12, proximate to the bushing, results in a positive soldering together of the two wires along the plane of physical contact.

The soldering operation is performed in a minimum of time, thereby eliminating the possibility of overheating the lead wire and thereby damaging the component, as often occurs with conventional soldering techniques. Another important feature of this method of soldering wires resides in the fact that the wires may be unsoldered by simply touching the soldering iron to the connection wire while pulling the wire upwardly, gently, but firmly. There remains no excess solder on the component lead whereby the same or other connection wire can again be soldered to the lead wire without additional preparation. Further, the maintenance of a pressure contact between the two wires within the bushing permits testing of the circuit before actually soldering together of the wires. Still further, the bushing prevents the accumulation of excess solder at the joint and serves as a good electrical insulation for the entire joint. Consequently, with this soldering technique, the possibility of electrical short circuits is completely eliminated. This factor is of considerable practical significance when a plurality of separate connections are to be made individually to closely-spaced lead wires, as, for example, in the case of pin sockets for transistors.

Although I have shown only a single connection wire soldered to the component lead, two or more connection wires can be soldered to the lead, by selecting a bushing having a proper hole diameter so that the required number of wires can be inserted into the bushing and, yet, retained in physical contact.

I have found that perfect soldered joints can be made as described hereinabove without the need of additional solder. However, the same method can be used in cases wherein it may be necessary or desirable to apply additional solder to the wires. In such case, the hole diameter of the bushing is selected to exceed slightly the space required by the wires. Upon touching one of the protruding wires with the tip of a soldering iron and simultaneously applying a soldering wire to the heated point, the solder flows into the bushing and around the contained wires.

Having now described my invention, what I desire to protect by Letters Patent of the United States is set forth in the following claims.

I claim:

1. A method of soldering together two wires having pre-tinned ends which method comprises inserting the pre-tinned end of each wire into a bushing made of nonconductive resilient material capable of withstanding normal soldering temperatures and which holds said wires in electrical contact with one another, and quickly applying sufficient heat without harmful excess to the protruding portion of one of the wires to form a soldered joint.

2. A method of soldering together two wires which method comprises pre-tinning an end of each wire, inserting the pre-tinned wire ends into opposite ends of a bushing made of resilient, non-conducting material capable of withstanding normal soldering temperatures and which holds said wires in electrical contact with one another, and quickly applying sufficient heat without harmful excess to a protruding end of one of the wires to form a soldered joint.

3. The invention as recited in claim 2, wherein the bushing has a hole diameter less than the combined diameters of the wires whereby the wire ends within the bushing are compressively held in side-by-side contact.

4. A method of soldering a plurality of connection wires to the pre-tinned lead of an electrical component, which method comprises inserting a resilient, non-conducting bushing capable of withstanding normal soldering temperatures over the component lead, the axial length of the bushing corresponding substantially to the length of the lead, pre-tinning an end of each connection wire, inserting the pre-tinned ends of the connection wires into the opposite end of the bushing to thereby place the lead wires in electrical contact and the bushing under radial stress, and applying heat to at least one of the connection wires proximate to the end surface of the bushing, of sufficient intensity to effect soldering between the wires in said bushing, but for a length of time affording a minimum possibility of damaging said component.

References Cited by the Examiner

UNITED STATES PATENTS

| | | | |
|---|---|---|---|
| 1,980,890 | 11/34 | Tompkins. | |
| 2,299,787 | 10/42 | Beal | 29—155.55 X |
| 2,517,677 | 8/50 | Kjell-Berger et al. | |
| 2,664,844 | 1/54 | Siegrist et al. | 113—111 X |

JOHN F. CAMPBELL, *Primary Examiner.*